United States Patent [19]
Nakabayashi

[11] 3,837,918
[45] Sept. 24, 1974

[54] SODIUM SULFUR STORAGE BATTERY

[75] Inventor: Takashi Nakabayashi, Takatsuki City, Japan

[73] Assignee: Agency of Industrial Science and Technology, Tokyo, Japan

[22] Filed: Mar. 14, 1973

[21] Appl. No.: 341,089

[30] Foreign Application Priority Data
May 16, 1972  Japan............................... 47-47758

[52] U.S. Cl.................. 136/6 FS, 136/20, 136/83 T
[51] Int. Cl. ........................................... H01m 43/00
[58] Field of Search........ 136/6 LF, 6 F, 6 FS, 6 R, 136/100 R, 20, 86 R, 83 R, 83 T

[56]  References Cited
UNITED STATES PATENTS

| | | |
|---|---|---|
| 2,666,091 | 1/1954 | Martin et al........................ 136/161 |
| 3,404,035 | 10/1968 | Kummer et al.................... 136/6 FS |
| 3,424,622 | 1/1969 | Dechert............................. 136/161 |
| 3,625,767 | 12/1971 | Clark et al. ....................... 136/83 T |
| 3,677,822 | 7/1972 | Bush.................................. 136/83 T |
| 3,679,480 | 7/1972 | Brown et al....................... 136/6 FS |
| 3,703,412 | 11/1972 | Levine ........................... 136/83 R X |
| 3,758,337 | 9/1973 | Fally et al.......................... 136/6 FS |

*Primary Examiner*—Anthony Skapars
*Attorney, Agent, or Firm*—Pierce, Scheffler & Parker

[57]  ABSTRACT

This invention relates to a novel sodium sulfur storage battery comprising a double vessel with thermal insulating layer therein and at least one unit cell, each unit cell containing a plurality of individual cells including sulfur as a cathodic reactant, sodium as an anodic reactant and a non-porous solid electrolyte. The storage battery is provided with a temperature control means. According to this invention, performance and durability of the soidum sulfur storage battery are highly improved.

3 Claims, 3 Drawing Figures

PATENTED SEP 24 1974  3,837,918

SODIUM SULFUR STORAGE BATTERY

This invention relates to a novel sodium sulfur storage battery.

In the prior art, a sodium sulfur storage battery generally comprises a vessel housing sulfur as a cathodic reactant, sodium as an anodic reactant and a nonporous solid electrolyte which only permits sodium ions to pass. In order to activate the battery, it is essential to keep the sulfur and sodium in the molten state at high temperature about 350° C. But, when these reactants are heated and begin to melt, the battery is liable to collapse due to the stress accumulated by volumetric expansion of the reactants. In that case, sulfur and sodium leak outside the cell and react directly with each other thereby causing a dangerous explosion. Besides these disadvantages, temperature is apt to rise excessively during the charging and discharging process and, as a result, the high temperature shortens the life of the battery components. Also, as the temperature rises, ohmic resistance of the solid electrolyte decreases thus causing a difference of electrical potential to be unstable.

According to the present invention, the above, and other disadvantages of the conventional sodium sulfur storage battery are largely avoided.

It is a principal object of this invention to provide a sodium sulfur storage battery giving high performance.

Another object of the invention is to provide a sodium sulfur storage battery enjoying a longer than conventional life.

A third inventive object is to provide a sodium sulfur storage battery which can be manufactured easily and at lower cost.

These and other objects and advantages will be apparent from the following detailed description when read in conjunction with the accompanying drawings, wherein.

Figure 1:
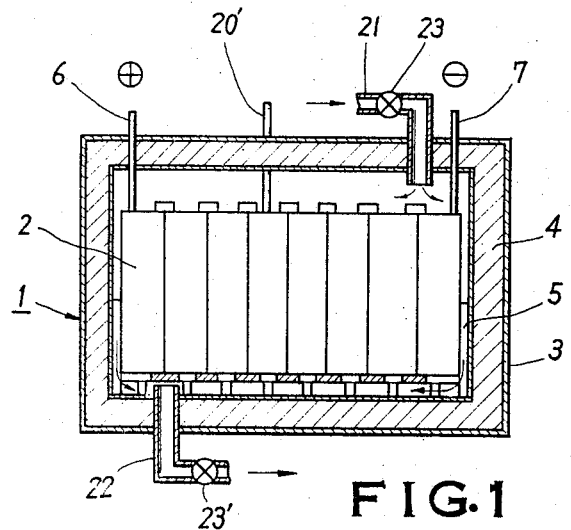
FIG. 1 is a central sectional and elevational view of a sodium sulfur storage battery embodying this invention.

Referring now to FIG. 1 of the drawing, a sodium sulfur storage battery 1, according to this invention, is constructed from a plurality of unit cells 2 and a double-walled aluminum vessel 3 in which the unit cells 2 are contained. The aluminum vessel 3 is made light in weight and has a thermal insulating layer 4 sandwiched in the space between its outer and inner shell walls. Located between the vessel 3 and unit cells 2 is a suitably shaped lattice frame 5 made of an insulating material such as ceramic, glass or the like, so as to serve as an electrical insulator between the vessel 3 and unit cells 2. The frame 5 also provides passageways for the cooling medium introduced inside the battery. A positive terminal post 6 and a negative terminal post 7 are fixed on the unit cells positioned on the opposite end of the array as shown in FIG. 1, and both posts extend through the upper wall of vessel 3.

Figure 2:
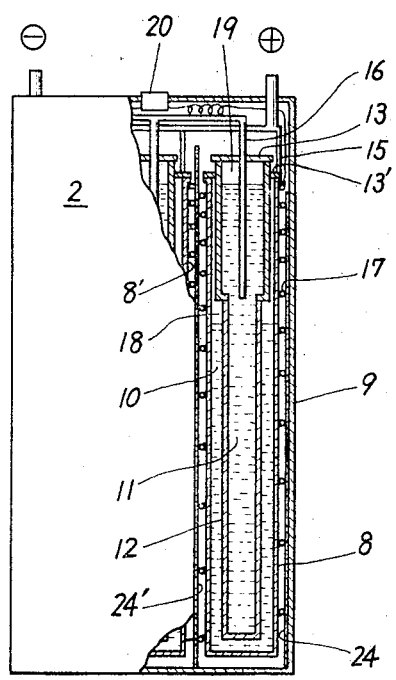
FIG. 2 is a fragmentary elevational section of a unit cell composing the sodium sulfur storage battery shown in FIG. 1.

Each unit cell 2 is composed of a plurality of individual cells 8 and an aluminum vessel 9 in which the cells 8 are contained as shown in FIG. 2.

Figure 3:
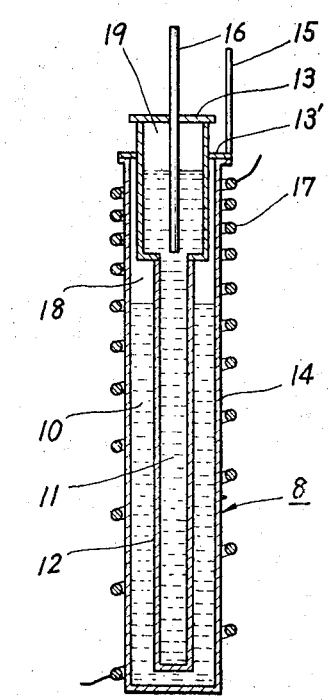
FIG. 3 is a sectional and elevational view of one cell composing the unit cell shown in FIG. 2.

As clearly shown in FIG. 3, each individual cell 8 is composed of sulfur 10 as a cathodic reactant; sodium 11 as an anodic reactant; a solid electrolyte 12 made of non-porous β alumina ($Na_2O \cdot 11Al_2O_3$) which admits only sodium ions to pass; a cell vessel 14 containing the anodic reactant with caps 13, 13' affixed thereto in liquid-tight relationship by glass seal or the like, — a positive lead 15 and a negative lead 16. The vessel 14 for each of the individual cells is made to provide a space 18 above the cathodic reactant, and similarly the anode container made of a solid electrolyte 12 is made to provide a space 19 above the anodic reactant. Numeral 17 illustrates an electrical heating means being wound around the cell 8. The heating device 17 is in the shape of a wire with an insulating sheath thereon, and the device 17 for each individual cell is connected to that immediately adjacent cell, as shown in FIG. 2 in the connection between cell 8 and cell 8'. An upper part of the device is shown in FIG. 2, with both its ends brought together to a terminal 20 on on the unit cell 2. The terminals 20 for each unit cell are brought together outside the vessel 3 as at 20' which in turn is connected to a source of electric power (not shown). The heating element of a device 17 may be selected from a metallic tape, a metallic ribbon and so on, in place of a wire as illustrated. The windings of the heating device 17 are closer together around cell 8, as the element goes up, as is shown in FIG. 3, so as to melt the upper parts of the reactants faster than the lower part. Numerals 24, 24' indicate insulating plates.

Sulfur 10 for the cathode and sodium 11 for the anode are maintained in the molten state at a suitably high temperature, e.g., a temperature of about 350° C., respectively, thereby generating electrical energy according to the following electromotive reaction:

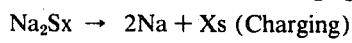

If it were not for the present invention, when sulfur 10 and sodium 11 begin to melt and expand, unexpected stresses due to the expansion would be liable to cause collapse of vessel 14 and of solid electrolyte 12, and thereby to shorten the life of the battery. Besides, if molten sulfur and sodium were to flow out of the cell, a dangerous accident would happen. But, since the heating device 17 is wound around the cell 8 closer on its upper part than on its lower part, and because the winding pitch changes gradually, both reactants in solid state begin gradually to melt from the upper part toward the lower part. Thus, any volume increase resulting from melting the reactant enters (i.e., expands) into space 18 or 19, respectively. Therefore, aforementioned stresses during the melting process are set free in the spaces 18 and 19 so that collapse of vessel 14 or of solid electrolyte 12, and the dangerous accident which might happen, can be avoided.

As is already disclosed in detail, it is one of the principal features of this invention that the windings of the heating device 17, consisting of a part of the temperature control means, are relatively close to the upper part, and relatively farther apart on the lower part. In other words, the heating device heats the upper part of the bodies of reactants comparatively stronger than the lower part.

During the charging or discharging process, an excessive increase in temperature due to the internal resistance of the solid electrolyte 12, etc., is inevitable. The excessive heat may be likely to corrode the battery components and to lessen durability of the battery, and also change the internal resistance of the solid electrolyte 12 thereby making it difficult to keep the electrical potential in a certain value. In order to prevent excessive heating of the battery and to maintain a suitable temperature, it is quite effective to employ a second temperature control means in which a cooling medium, for example, inert gas such as nitrogen gas, argon gas or the like, or, in some cases ordinary air, is forced to pass through the inside of the battery. This is another principal feature of this invention.

In FIG. 1, a valved introduction pipe 21 is connected at its one end to a supply tank (not shown) of the selected cooling medium, and at its opposite end to the inside of vessel 3, through an electromagnetic valve 23. An exhaust pipe 22 leads the cooling medium, after having passed through vessel 3, to a heat-exchange device (not shown) through an electromagnetic valve 23' in pipe 22, so as to circulate the cooling medium. Both valve 23 and valve 23' are controlled by a temperature detector such as a thermocouple or the like which is well known in the art so that the battery is kept at a preferred constant temperature.

According to the present invention, a sodium sulfur storage battery which has many prominent advantages is provided: i.e., it keeps constant temperature in the oepration; it has a long life compared with prior sodium sulfur storage batteries; it keeps its electrical potential at a certain value; and, there is not the slightest fear of unexpected dangerous accident.

It is to be understood that this invention is not limited to the examples herein shown and described, but that changes and modifications may be made without departing from the spirit and scope of the invention, as defined in the appended claims.

I claim:

1. A sodium-sulfur storage battery comprising a double-walled vessel with thermal insulating layer therein and at least one unit cell contained in said vessel, each said unit cell being composed of a plurality of individual cells, each individual cell comprising an inner vessel formed of solid non-porous electrolyte and containing a body of sodium as anodic reactant, an outer vessel containing a body of sulfur as cathodic reactant, said inner vessel being substantially completely enclosed within said outer vessel and surrounded by said body of cathodic reactant, together with a temperature control means, at least a part of said temperature control means being in the form of a heating device provided around each individual cell, said heating device being adapted to melt both reactants gradually from the upper part toward the lower part of the individual cell.

2. A sodium sulfur storage battery as defined in claim 1, in which said heating device is wound as a helix around the individual cell, and wherein the turns of the helix are closer as the helix rises from bottom to top.

3. A sodium-sulfur storage battery as defined in claim 1, which includes means for passing a cooling medium, as part of said temperature control means, into and through the storage battery so as to keep constant the inside temperature, said cooling medium passing throughout the vessel wherein the unit cell is placed on a frame made of an insulating material having passageways for said cooling medium.

* * * * *